(12) United States Patent
Putnam

(10) Patent No.: US 6,971,660 B1
(45) Date of Patent: Dec. 6, 2005

(54) KINGPIN ADAPTOR SYSTEM

(76) Inventor: Rex D. Putnam, 10201 Moser Dr., Bronson, MI (US) 49028

( * ) Notice: Subject to any disclaimer, the term of this patent is extended or adjusted under 35 U.S.C. 154(b) by 0 days.

(21) Appl. No.: 10/838,984

(22) Filed: May 5, 2004

Related U.S. Application Data

(60) Provisional application No. 60/467,880, filed on May 5, 2003.

(51) Int. Cl.[7] .................................................. B60D 1/07
(52) U.S. Cl. ..................................... 280/416.1; 280/901
(58) Field of Search ...................... 280/416.1, 415.1, 280/901, 511, 417.1, 416.3

(56) References Cited

U.S. PATENT DOCUMENTS 3,791,674 A * 2/1974 Berends ...................... 280/433
4,887,831 A 12/1989 Edwards
5,513,869 A 5/1996 Putnam
5,788,257 A 8/1998 Meyerhofer
6,416,073 B1 * 7/2002 Marcy ..................... 280/416.1
6,540,246 B2 * 4/2003 Andersen et al. ........ 280/417.1
6,776,431 B1 * 8/2004 Dick ........................ 280/425.2
6,808,195 B2 * 10/2004 Smith ...................... 280/417.1

* cited by examiner

*Primary Examiner*—Tony Winner
(74) *Attorney, Agent, or Firm*—Mary M. Moyne; Ian C. McLeod

(57) ABSTRACT

A kingpin adaptor system which enables a fifth wheel trailer to be connected to a towing vehicle having an upside down kingpin. The kingpin adaptor system includes an inverted fifth wheel head assembly and a kingpin adaptor. The kingpin of the fifth wheel trailer is secured in one end of the kingpin adaptor and the fifth wheel head assembly is mounted at the other end of the kingpin adaptor. The kingpin adaptor system enables a towing vehicle with a kingpin in an upside down position to tow a fifth wheel trailer without greatly increasing the leverage on the pin box of the trailer.

21 Claims, 4 Drawing Sheets

KINGPIN ADAPTOR SYSTEM

CROSS-REFERENCE TO RELATED APPLICATIONS

This application claims the benefit of U.S. Provisional Application No. 60/467,880, filed May 5, 2003.

STATEMENT REGARDING FEDERALLY SPONSORED RESEARCH OR DEVELOPMENT

Not Applicable

BACKGROUND OF THE INVENTION (1) Field of the Invention

The present invention relates to a kingpin adaptor system which enables a fifth wheel trailer having a kingpin to be connected to a towing vehicle having a kingpin in an inverted, upside down position. In particular, the present invention relates to a kingpin adaptor system which allows for connecting an inverted fifth wheel head assembly onto the kingpin of the fifth wheel trailer to enable the fifth wheel trailer to be connected to an upside down kingpin on the towing vehicle.

(2) Description of the Related Art

The related art has shown various types of hitch conversion systems. Illustrative are U.S. Pat. No. 4,887,831 to Edwards; U.S. Pat. No. 5,788,257 to Meyerhofer and U.S. Pat. No. 6,416,073 to Marcy.

Edwards describes a convertible hitch for hitching mobile equipment to a fifth wheel of a highway vehicle or alternatively, for hitching mobile equipment to a tow bar coupling of a field vehicle. A first hitch is attached to the mobile equipment and has a kingpin protruding downward for connection to the fifth wheel of the highway vehicle. A second hitch includes a tow bar member removably attachable to the tow bar coupling of the field vehicle. The second hitch also has a central aperture for engagement with the kingpin of the first hitch. This invention allows for connection of a fifth wheel trailer having a kingpin to a ball joint.

Meyerhofer describes a fifth wheel trailer hitch adaptor for hitching a trailer to a frame mounted hitch disposed under the bumper of the towing vehicle. In use, the adaptor is releasably coupled to the tow bar of a conventional towing vehicle. A fifth wheel device or a kingpin is then mounted on the adaptor. In one (1) embodiment, the kingpin is mounted in an upside down position on the adaptor on the towing vehicle tow bar and the fifth wheel device is mounted in an inverted or upside down position on the trailer tongue. The invention allows for converting a conventional ball hitch trailer to a kingpin construction.

Marcy describes a hitch conversion system which enables a trailer having a kingpin to be towed by a vehicle having a ball-type hitch.

There remains the need for a hitch adaptor system which enables a fifth wheel trailer having a kingpin to be coupled to a towing vehicle having an inverted kingpin.

SUMMARY OF THE INVENTION

The present invention relates to a kingpin or hitch adaptor system which mounts on the kingpin of a fifth wheel trailer and which enables the trailer to be connected to and towed by a towing vehicle having an upside down or inverted kingpin. The present invention enables a fifth wheel trailer to be towed by a standard pickup truck by mounting a kingpin in the bed of the truck in the inverted position. The kingpin adaptor system includes an inverted fifth wheel head assembly and a kingpin adaptor. In one (1) embodiment, the kingpin adaptor includes an adaptor connector with opposed ends with an opening into a hollow inner chamber at one end. In use, the kingpin of the fifth wheel trailer is secured in the inner chamber of the kingpin adaptor. Gibbs are provided for mounting around the reduced center portion of the kingpin of the trailer. The gibbs give the kingpin an outer shape and size similar to the shape and size of the inner chamber of the adaptor connector. The kingpin is held in the adaptor connector by securing rods which extend through one sidewall of the adaptor through the gibbs and through the other sidewall of the adaptor. Securing bolts are provided to secure the kingpin with the gibbs in the kingpin connector to prevent the kingpin adaptor from rotating when the trailer turns. The adaptor connects an inverted fifth wheel head assembly to the kingpin of the trailer. In one (1) embodiment, the adaptor is connected to the fifth wheel head assembly by a ball and socket joint. In this embodiment, the adaptor has a hitch ball at the end opposite the opening to the inner chamber. The hitch ball mounts in the upper tube of the fifth wheel head assembly. A pair of flexible half shell bearings create the socket in the upper tube in which the hitch ball pivots. In this embodiment, the hitch adaptor system enables a towing vehicle with a kingpin in an upside down position to tow a fifth wheel trailer without greatly increasing the leverage on the pin box of the trailer.

The present invention relates to a kingpin adaptor system for connecting a fifth wheel trailer having a first kingpin to a towing vehicle having a second kingpin in an upside down position, which comprises: an adaptor having opposed first and second ends and configured to be secured at the first end on the first kingpin of the fifth wheel trailer; and a fifth wheel head assembly having a first side and a second side and mounted on the first side to the second end of the adaptor so that the second side of the fifth wheel head assembly can be secured on the second kingpin to connect the fifth wheel trailer to the towing vehicle.

Further, the present invention relates to a kingpin adaptor system for connecting a fifth wheel trailer having a first kingpin to a towing vehicle having a second kingpin in an upside down position, which comprises: an adaptor having opposed first and second ends and configured to be connected at the first end to the first kingpin; a fifth wheel head assembly having a first side and a second side with the second side being configured to be secured to the second kingpin; and means for connecting the adaptor to the fifth wheel head assembly.

Still further, the present invention relates to a method for connecting a fifth wheel trailer to be towed having a first kingpin to a towing vehicle having a second kingpin in an inverted position, which comprises the steps of: providing a kingpin adaptor system having an adaptor having opposed first and second ends and configured to be secured at one end on the first kingpin of the fifth wheel trailer; and a fifth wheel assembly having a first side and a second side and mounted on the first side to the second end of the adaptor in an inverted position so that the second side of the fifth wheel head assembly can be secured to the second kingpin to connect the fifth wheel trailer to the towing vehicle; securing the adaptor to the first kingpin so that the fifth wheel head assembly is in an inverted position; moving the towing vehicle toward the fifth wheel trailer so that the second kingpin is moved into the fifth wheel head assembly; and securing the fifth wheel head assembly onto the second kingpin so that the fifth wheel trailer is connected to the towing vehicle.

The substance and advantages of the present invention will become increasingly apparent by reference to the following drawings and the description.

DESCRIPTION OF THE PREFERRED EMBODIMENTS

Figure 3:
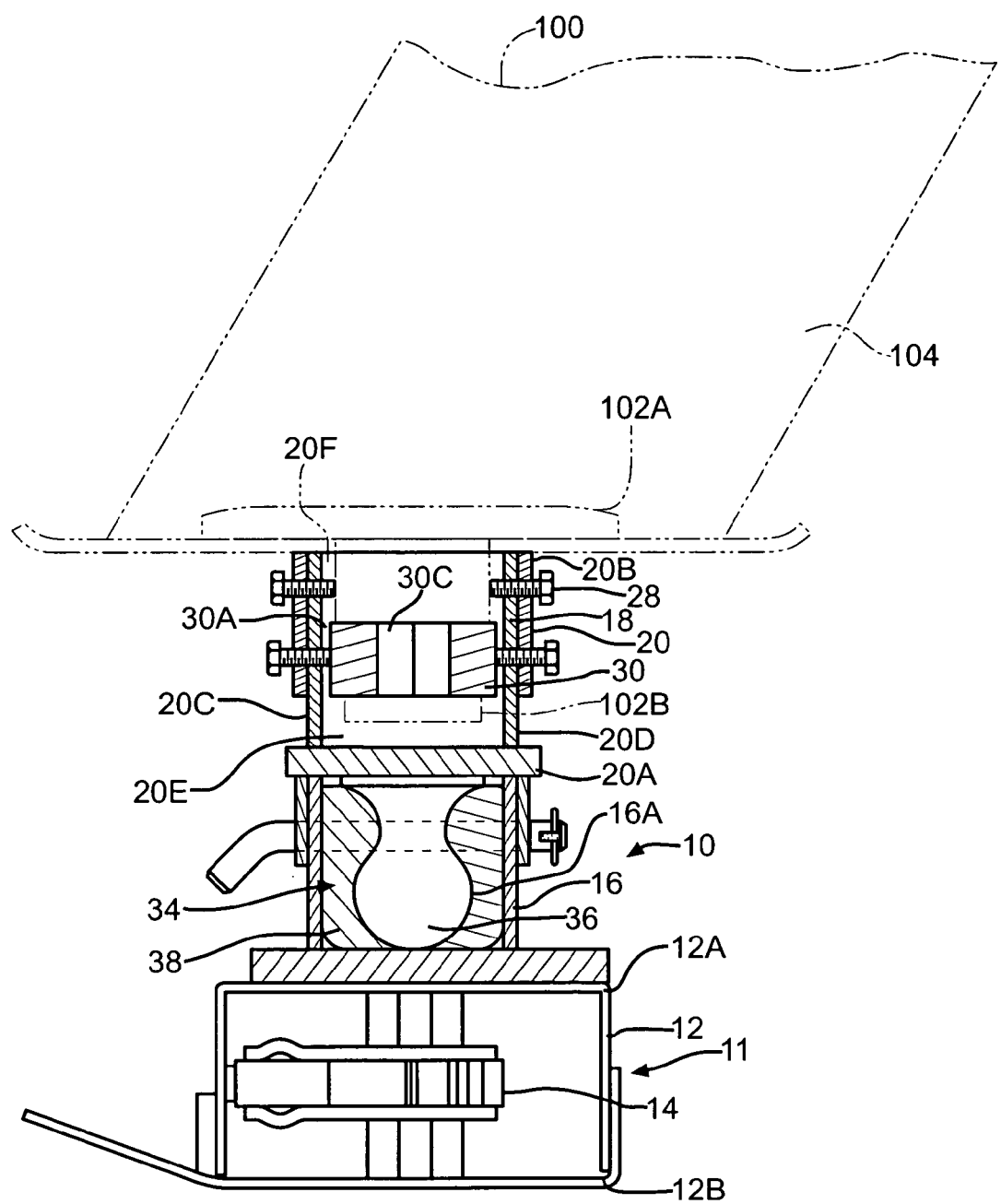
FIG. 3 is a cross-sectional view of the kingpin adaptor system 10 showing the gibbs 30 positioned around the kingpin 102 of the trailer 100 and showing the securing bolts 28.
Figure 4:
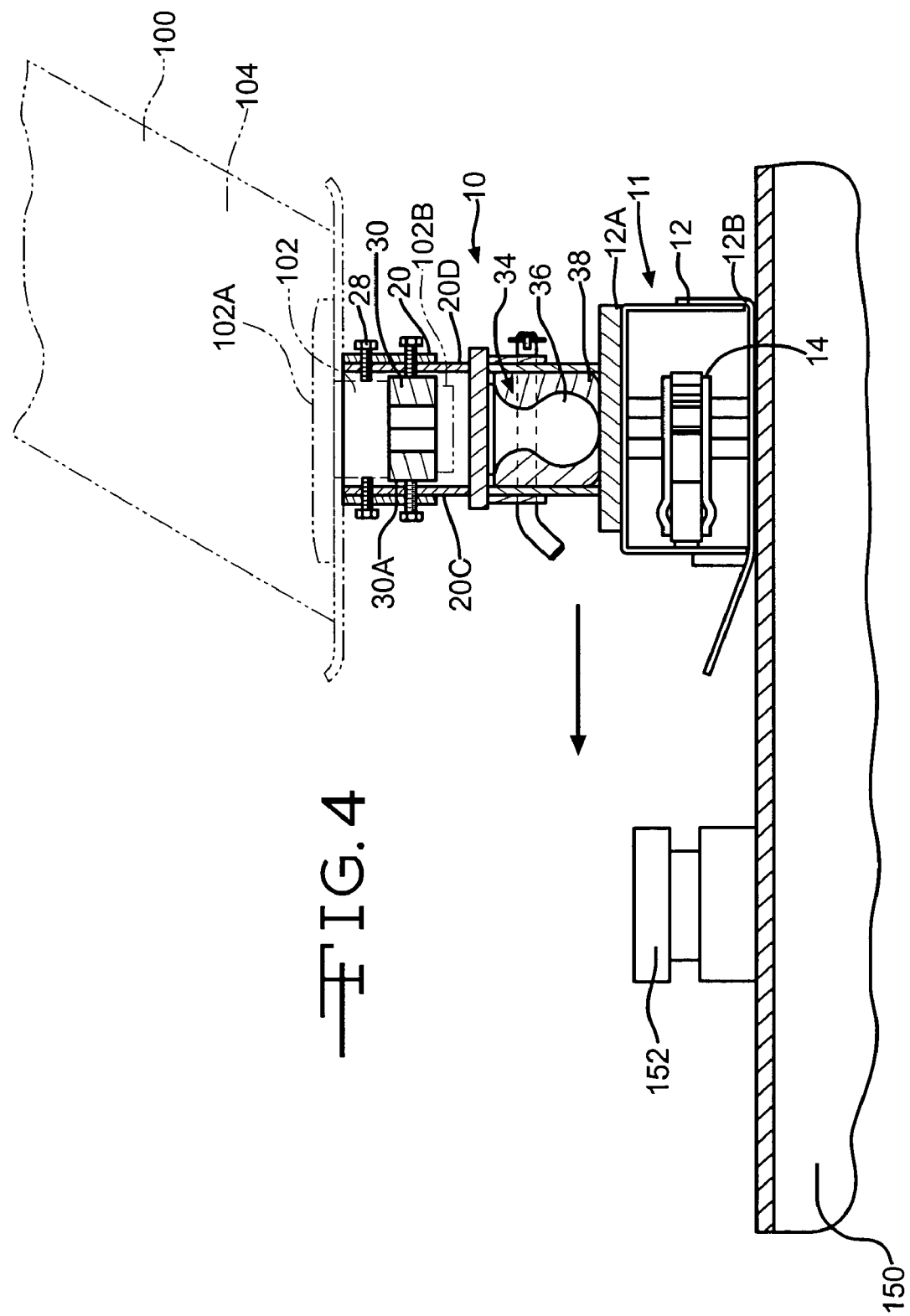
FIG. 4 is a cross-sectional view showing the kingpin adaptor system 10 connected on the kingpin 102 of the trailer 100 and showing the inverted kingpin 152 in the bed 150A of the truck 150.

The present invention is a kingpin or hitch adaptor system 10 which enables a fifth wheel trailer 100 having a kingpin 102 to be coupled to a towing vehicle 150 having a kingpin 152 in an inverted position. The present invention enables a fifth wheel head assembly 150 to be mounted on or connected to the kingpin 102 of a fifth wheel trailer 100 in an inverted position so that the inverted fifth wheel head assembly 150 can be connected to an inverted kingpin 152. In one (1) embodiment, the towing vehicle 150 is a pick-up truck 150 and the kingpin 152 is mounted in the bed 150A of the pick-up truck in the inverted position (FIG. 4). In one (1) embodiment, the fifth wheel trailer 100 is a standard fifth wheel trailer having a pin box 104 with a kingpin 102 extending downward (FIGS. 3 and 4). The kingpin 102 is preferably a standard kingpin having a first, upper disk portion 102A mounted in the pin box 104 of the trailer 100 with a second, lower portion 102B spaced below the pin box 104. The lower portion 102B having a center portion 102C having a reduced diameter.

Figure 2:
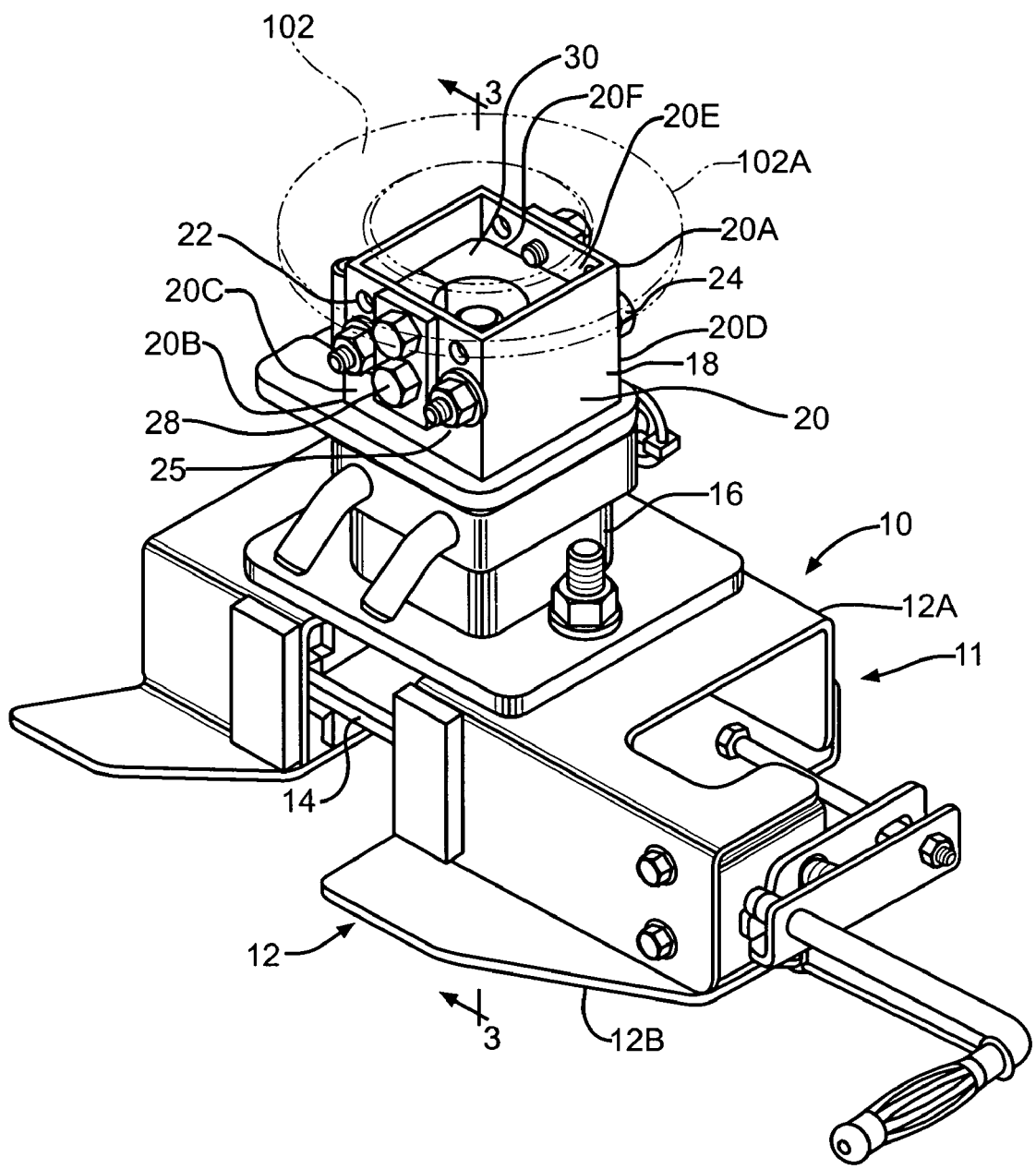
FIG. 2 is a perspective view of the kingpin adaptor system 10.

The hitch adaptor system 10 includes a fifth wheel head assembly 11 and a kingpin adaptor 18 (FIG. 2). The body 12 of the fifth wheel head assembly 11 can be similar to any fifth wheel head assemblies well known in the art. In one (1) embodiment, the body 12 of the fifth wheel head assembly 11 has a first, upper side 12A and a second, lower side 12B with a kingpin coupler 14 spaced therebetween. The kingpin coupler 14 can be any type of kingpin coupler known in the art. In one (1) embodiment, the kingpin coupler 14 is similar to the kingpin coupler disclosed in Applicant's co-pending U.S. patent application entitled "Kingpin Coupler", application Ser. No. 10/288,919, filed on Nov. 6, 2002. The patent application is incorporated herein in its entirety by reference.

The kingpin adaptor 18 can have a variety of configurations. In one (1) embodiment, the kingpin adaptor 18 has a kingpin connector 20 with a first end 20A and a second end 20B with a first, front sidewall 20C and a second, back sidewall 20D therebetween forming an inner chamber 20E. The first end 20A of the kingpin connector 20 is configured to be connected to the kingpin 102 of the trailer 100. The second end 20B of the kingpin connector 20 is configured to be connected to the body 12 of the fifth wheel head assembly 11. The first end 20A of the kingpin connector 20 has an opening 20F which allows access to the inner chamber 20E of the kingpin connector 20. In one (1) embodiment, the second end of the kingpin connector 20 is connected to the connector tube 16 of the fifth wheel head assembly 11. The front and back sidewalls 20C and 20D of the kingpin connector 20 are provided with a pair of horizontally spaced holes 22. The pair of holes 22 in the front sidewall 20C are aligned with the pair of holes 22 in the back sidewall 20D. In one (1) embodiment, the front and back sidewalls 20C and 20D have two (2) pairs of holes 22 vertically spaced apart. A pair of securing rods 24 are provided for inserting into the holes 22 in the front sidewall 20C through the inner chamber 20E and out through the holes 22 in the back sidewall 20D. In one (1) embodiment, the securing rods 24 are bolts and fasteners 25 are provided to secure the bolts in place in the kingpin connector 20. The front and back sidewalls 20C and 20D can also be provided with threaded holes 26. Securing bolts 28 are provided to be inserted into the holes 26. In one (1) embodiment, the front and back sidewalls 20C and 20D are provided with two (2) threaded holes 26 each being provided with a securing bolt 28 used to prevent kingpin adaptor 18 from rotating as the trailer 100 turns.

In one (1) embodiment, a pair of gibbs 30 are provided for positioning around the reduced diameter center portion 102C of the kingpin 102 of the trailer 100. The pair of kingpin gibbs 30 have an outer surface 30A and an inner surface 30B and are preferably identical. The inner surfaces 30B of the gibbs 30 each have a semi-circular section 30C so that when the gibbs 30 are positioned around the center portion 102C of the kingpin 102 of the trailer 100, the gibbs 30 completely encircle the center portion 102C of the kingpin 102. The gibbs 30 are provided with holes 32 spaced on either side of the semi-circular section 30C of the inner surface 30B. The holes 32 allow securing pins (not shown) and the securing rods 24 to be inserted through the gibbs 30 to secure the gibbs 30 on the kingpin 102. In one (1) embodiment, when the gibbs 30 are secured around the center portion 102C of the kingpin 102, the outer surface 30A of the gibbs 30 have a shape and size essentially equal to the shape and size of the inner chamber 20E of the kingpin connector 20. The inner chamber 20E of the kingpin connector 20 has a size at least as great as the size of the second lower portion 102B of the kingpin 102 of the trailer 100 so that the kingpin 102 with gibbs 30 in place around the reduced diameter center portion 102C of the trailer kingpin 102 can be easily inserted into the center, inner chamber 20E of the kingpin connector 20 (FIG. 3). In one (1) embodiment, the inner chamber 20E has a square cross-sectional shape. In one (1) embodiment, the gibbs 30 are constructed of steel.

Figure 1:
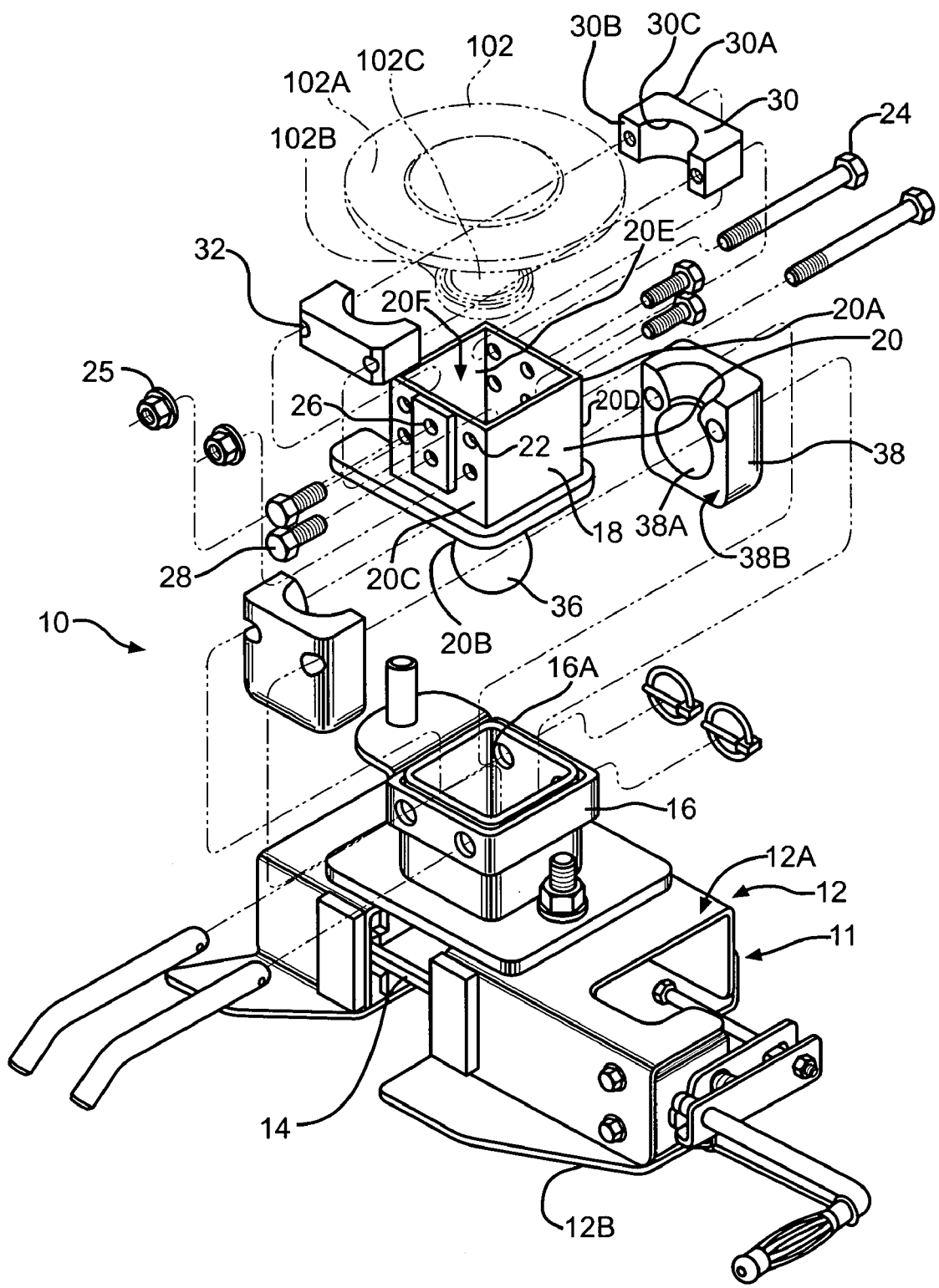
FIG. 1 is an exploded view of the kingpin adaptor system 10 showing the kingpin adaptor 18 and the fifth wheel head assembly 11 in an inverted position.

In one (1) embodiment, the kingpin adaptor 18 is connected to the fifth wheel head assembly 11 by a ball and socket joint 34 or a universal joint. In one (1) embodiment, the kingpin connector 20 has a hitch ball 36 at the second end 20B and the body 12 of the fifth wheel head assembly 11 has a hollow connector tube 16 on its upper side 12A which extends outward away from the lower side 12B of the body 12 of the fifth wheel head assembly 11. In one (1) embodiment, a pair of half-shell bearings 38 mount around the hitch ball 36 in the connector tube 16 (FIG. 1). In this embodiment, the center chamber 16A of the connector tube 16 has a square cross-section with a rectangular overall shape. The half-shell bearings 38, when correctly positioned together, have an outer shape and size similar to the shape and size of the center chamber 16A of the connector tube 16.

Each of the half-shell bearings 38 have an indention 38A in their inner wall 38B. The indentions 38A are shaped similar to the hitch ball 36 so that when the two (2) half-shell bearings 38 are positioned together, the indentions 38A form a complete cavity having a shape similar to the shape of the hitch ball 36. The bearings 38 and the tube 16 have holes which allow securing rods to be inserted through the adaptor box and the bearings in the tube 16. The connection of the hitch ball 36 to the connector tube 16 of the body 12 of the fifth wheel head assembly 11 allows the connector tube 16 and thus, the fifth wheel head assembly 11 to pivot in all directions about the hitch ball 36 similar to a standard ball and socket joint. In one (1) embodiment, the hitch ball 36 and connector tube 16 connection is similar to the connection of the hitch ball 36 to the adaptor of the fifth wheel head assembly described in Applicant's U.S. Pat. No. 5,513,869, which is incorporated herein in its entirety by reference.

In another embodiment, not shown, the kingpin adaptor is connected to the inverted fifth wheel head assembly 11 by a first and second pivotable connection providing a first and second pivot point between the kingpin adaptor and the fifth wheel head assembly 11. One (1) pivot point enables the fifth wheel head assembly to pivot in the front and back directions and the other pivot point enables the fifth wheel head assembly to pivot in the right and left or side to side directions. The kingpin adaptor is mounted at one end to the kingpin 102 of the trailer 100. The kingpin adaptor 18 is pivotably connected at the other end by a rod to a lower bracket which is part of the fifth wheel head assembly 11. The pivotable connection of the kingpin adaptor and the lower bracket forms the first pivot point. The kingpin adaptor is provided with a series of holes vertically spaced along the sides of the kingpin adaptor. This allows the first pivot point to be vertically adjusted. The first or upper plate of the fifth wheel head assembly 11 is provided with a mounting tube which is connected to the lower bracket. The lower bracket is pivotably connected to a mounting tube on the upper plate of the fifth wheel head assembly 11 with a pin. The lower bracket can be pivotably connected to the mounting tube by a pin. The pin can be secured by any well known means. The connection of the lower bracket to the mounting tube of the fifth wheel head assembly 11 forms the second pivot point.

To use the kingpin adaptor system 10, the kingpin gibbs 30 are secured around the kingpin 102 of the trailer 100. In one (1) embodiment, pins are inserted into the holes 32 of the gibbs 30 to secure the gibbs 30 together on the kingpin 102. In one (1) embodiment, the kingpin gibbs 30 are secured around the reduced diameter, center portion 102C of the trailer kingpin 102. Once the kingpin gibbs 30 are secured in position, the trailer kingpin 102 with the kingpin gibbs 30 is inserted through the opening 20F in the first end 20A of the kingpin connector 20 into the inner chamber 20E of the kingpin connector 20. To secure the trailer kingpin 102 and kingpin gibbs 30 in the kingpin connector 20, the securing rods 24 are inserted into the holes 22 in the first or front sidewall 20C of the kingpin connector 20, through the holes 32 in each of the kingpin gibbs 30 and out through the holes 22 in the second or back sidewall 20D of the kingpin connector 20. The securing rods 24 preferably extend through the adaptor connector 20 at a point spaced adjacent the center portion 102C of the kingpin 102. In one (1) embodiment, there are two (2) securing rods 24 and the distance between the securing rods 24 is less than a diameter of the lower portion 102B of the kingpin 102 below the center portion 102C. In one (1) embodiment, the securing rods 24 are inserted into the same holes 32 as the pins used to initially secure the kingpin gibbs 30 around the trailer kingpin 102. In this embodiment, the securing rods 24 push the pins out of the kingpin gibbs 30. In one (1) embodiment, the securing rods 24 are bolts and fasteners 25 threaded onto or otherwise attached onto the threaded end of the securing rods 24 to secure the kingpin adaptor 18 to the kingpin 102. After the kingpin 102 with the gibbs 30 is secured in the kingpin connector 20, the securing bolts 28 are inserted and tightened into the holes 26 in the sidewall 20C and 20D of the kingpin connector 20 until the securing bolts 28 contact the gibbs 30 and the kingpin 102 and securely lock the kingpin 102 in position in the kingpin connector 20 so that the kingpin 102 can not move in the kingpin connector 20. The securing bolts 28 lock the kingpin adaptor 18 onto the kingpin 102 so that when the trailer 100 turns, the kingpin adaptor 18 rotates with the kingpin 102. Thus, during turning, the kingpin adaptor system 10 rotates on the inverted kingpin 152 of the towing vehicle 150.

Once the kingpin adaptor system 10 is connected to the kingpin 102 of the trailer 100, the trailer 100 can be connected to the inverted kingpin 152 mounted on the towing vehicle 150. In one (1) embodiment, the inverted kingpin 152 is mounted in the upside down or inverted position in the bed 150A of a pick up truck 150. Positioning and securing the inverted kingpin 152 of the towing vehicle 150 in the inverted kingpin head assembly 11 is well known in the art. The fifth wheel trailer 100 can then be towed by the towing vehicle 150.

In the one (1) embodiment, where the kingpin adaptor 18 is connected to the fifth wheel head assembly 11 by a ball and socket joint 34, the hitch ball 36 on the second end 20B of the adaptor connector 20 is approximately 0.50 inches (1.27 cm) away from the kingpin 102 of the fifth wheel trailer 100. Thus, the pivot point between the fifth wheel trailer 100 and the towing vehicle 150, at the hitch ball 36, is essentially at the same position as the pivot point between a standard fifth wheel towing vehicle and a standard fifth wheel trailer. The positioning of the pivot point at essentially the same height as the standard pivot point keeps the leverage on the pin box 104 of the fifth wheel trailer 100 essentially equal to the leverage normally placed on the pin box of a fifth wheel trailer during standard towing. In the one (1) embodiment, where the kingpin adaptor is connected to the inverted fifth wheel head assembly 11 by a first and second pivotable connection, the first pivot point is positioned approximately 1.3 inches (3.33 cm) from the bottom of the kingpin 102. Thus, the leverage on the pin box 104 of the trailer 100 during towing by a towing vehicle 150 having the inverted kingpin 152 is equal to or only slightly greater than the leverage placed on the pin box 104 during towing by a standard fifth wheel towing vehicle.

It is intended that the foregoing description be only illustrative of the present invention and that the present invention be limited only by the hereinafter appended claims.

I claim:

1. A kingpin adaptor system for connecting a fifth wheel trailer having a first kingpin to a towing vehicle having a second kingpin in an upside down position, which comprises:

(a) an adaptor having opposed first and second ends and configured to be secured at the first end on the first kingpin of the fifth wheel trailer; and (b) a fifth wheel head assembly having a first side and a second side and mounted on the first side to the second end of the adaptor so that the fifth wheel head assembly is inverted and the second side of the fifth wheel head assembly can be secured on the second kingpin to connect the fifth wheel trailer to the towing vehicle.

2. The system of claim 1 wherein the first end of the adaptor has an opening into an inner chamber and wherein the first kingpin is inserted through the opening in the first end of the adaptor into the inner chamber and secured in the inner chamber to secure the adaptor onto the first kingpin.

3. The system of claim 2 wherein the first kingpin has a first disk and a second disk with a center portion spaced therebetween and wherein when the adaptor is secured onto the first kingpin, the second disk and the center portion of the first kingpin extend into the inner chamber of the adaptor.

4. The system of claim 3 wherein a pair of gibbs are provided for securing around the center portion of the first kingpin and wherein when the gibbs are secured around the center portion of the first kingpin, an outer shape and size of the gibbs is essentially equal to a shape and size of the inner chamber of the adaptor.

5. The system of claim 4 wherein the adaptor has opposed sidewalls between the ends, wherein the opposed sidewalls are provided with holes, wherein the gibbs are provided with holes and wherein to secure the first kingpin with the gibbs in the inner chamber of the adaptor, the first kingpin with the gibbs is inserted into the inner chamber and the holes in the gibbs are aligned with the holes in the sidewalls of the adaptor and pins are inserted into the holes in one of the opposed sidewalls of the adaptor through the holes in the gibbs and out through the holes in the other of the opposed sidewall of the adaptor.

6. The system of claim 4 wherein bolts are threaded through holes in the sidewall of the adaptor and into contact with the gibbs to prevent rotation of the adaptor.

7. The system of claim 1 wherein the second end of the adaptor is provided with a ball hitch which is connected to the first side of the fifth wheel head assembly.

8. The system of claim 7 wherein a tube is mounted on the first side of the fifth wheel head assembly and pillow blocks are provided for mounting around the ball hitch in the tube to form a ball and socket connection.

9. The system of claim 1 wherein the fifth wheel head assembly is connected to the adaptor by a ball and socket joint.

10. The system of claim 9 wherein the ball and socket joint is spaced a predetermined distance from the first kingpin so that an amount of leverage force exerted on the first kingpin and a pin box of the fifth wheel trailer is essentially equal to a standard leverage force exerted on a kingpin and a king pin box of a standard fifth wheel trailer during towing.

11. A kingpin adaptor system for connecting a fifth wheel trailer having a first kingpin to a towing vehicle having a second kingpin in an upside down position, which comprises:
(a) an adaptor having opposed first and second ends and configured to be connected at the first end to the first kingpin;
(b) a fifth wheel head assembly having a first side and a second side and connected to the adaptor in an inverted position with the second side being configured to be secured to the second kingpin; and
(c) means for connecting the adaptor to the fifth wheel head assembly.

12. The system of claim 11 wherein the means for connecting the adaptor to the fifth wheel head assembly is a ball and socket joint.

13. The system of claim 12 wherein a ball of the ball and socket joint is mounted on the second end of the adaptor and a socket of the ball and socket joint is located on the first side of the fifth wheel head assembly.

14. The system of claim 13 wherein the ball and socket joint is spaced apart from a pin box of the trailer having the first kingpin.

15. A method for connecting a fifth wheel trailer to be towed having a first kingpin to a towing vehicle having a second kingpin in an inverted position, which comprises the steps of:
(a) providing a kingpin adaptor system having an adaptor having opposed first and second ends and configured to be secured at one end on the first kingpin of the fifth wheel trailer; and a fifth wheel assembly having a first side and a second side and mounted on the first side to the second end of the adaptor in an inverted position so that the second side of the fifth wheel head assembly can be secured to the second kingpin to connect the fifth wheel trailer to the towing vehicle;
(b) securing the adaptor to the first kingpin so that the fifth wheel head assembly is in an inverted position;
(c) moving the towing vehicle toward the fifth wheel trailer so that the second kingpin is moved into the fifth wheel head assembly; and
(d) securing the fifth wheel head assembly onto the second kingpin so that the fifth wheel trailer is connected to the towing vehicle.

16. The method of claim 15 wherein the adaptor has an opening in the first end leading into an inner chamber and wherein further in step (b), the first kingpin is inserted through the opening into the inner chamber of the adaptor.

17. The method of claim 16 wherein gibbs are provided for securing around a center portion of the first kingpin and wherein in step (b), the gibbs are positioned around the center portion of the first kingpin before the first kingpin is inserted into the inner chamber.

18. The method of claim 17 wherein an outer shape and size of the gibbs is essentially equal to a shape and size of the inner chamber of the adaptor so that after step (d), when the fifth wheel vehicle is being towed, movement of the first kingpin in the inner chamber of the adaptor is minimal.

19. The method of claim 17 wherein spacers are provided on the adaptor and wherein in step (b), after the first kingpin with the gibbs is inserted into the inner chamber of the adaptor, the spacers are adjusted to center the first kingpin with the gibbs in the inner chamber of the adaptor.

20. The method of claim 15 wherein the fifth wheel head assembly is connected to the adaptor by a ball and socket joint and wherein after step (d), the fifth wheel trailer is towed by the towing vehicle and wherein the ball and socket joint allows movement of the adaptor on the fifth wheel head assembly in a variety of directions.

21. The method of claim 20 wherein the ball and socket joint is spaced apart from the first kingpin when the adaptor is mounted on the first kingpin and wherein after step (d), the fifth wheel trailer is towed and a leverage force on the first kingpin is essentially equal to a standard leverage force applied to a kingpin of a fifth wheel trailer during standard towing.

* * * * *